US012093054B2

(12) United States Patent
Guo et al.

(10) Patent No.: US 12,093,054 B2
(45) Date of Patent: Sep. 17, 2024

(54) MOVING TARGET FOLLOWING METHOD, ROBOT AND COMPUTER-READABLE STORAGE MEDIUM

(71) Applicants: UBTECH NORTH AMERICA RESEARCH AND DEVELOPMENT CENTER CORP, Pasadena, CA (US); UBTECH ROBOTICS CORP LTD, Shenzhen (CN)

(72) Inventors: Dejun Guo, San Gabriel, CA (US); Ting-Shuo Chou, Pasadena, CA (US); Yang Shen, Los Angeles, CA (US); Huan Tan, Pasadena, CA (US)

(73) Assignee: UBKANG (QINGDAO) TECHNOLOGY CO., LTD., Qingdao (CN)

( * ) Notice: Subject to any disclaimer, the term of this patent is extended or adjusted under 35 U.S.C. 154(b) by 708 days.

(21) Appl. No.: 17/239,603

(22) Filed: Apr. 25, 2021

(65) Prior Publication Data

US 2022/0350342 A1   Nov. 3, 2022

(51) Int. Cl.
*G05D 1/00* (2024.01)
*G01S 17/89* (2020.01)
(Continued)

(52) U.S. Cl.
CPC ............ *G05D 1/0253* (2013.01); *G01S 17/89* (2013.01); *G05D 1/12* (2013.01); *G06N 3/08* (2013.01);
(Continued)

(58) Field of Classification Search
CPC ........ G05D 1/0253; G05D 1/12; G01S 17/89; G01S 7/4808; G01S 17/86; G01S 17/931;
(Continued)

(56) References Cited

U.S. PATENT DOCUMENTS 9,661,470 B1 * 5/2017 Du Bois ............... H04W 4/027
2018/0259971 A1 * 9/2018 Nishimura ........... G05D 1/0246
(Continued)

FOREIGN PATENT DOCUMENTS

| CN | 109947119 B | | 6/2019 | |
|---|---|---|---|---|
| CN | 111603172 A | * | 9/2020 | ............ A61B 5/112 |
| CN | 114612929 A | * | 12/2020 | ........... G06V 10/764 |

OTHER PUBLICATIONS

Machine translation of CN109947119A via Espacenet.com, Fang Zheng, "Mobile robot autonomous following system and method based on multi-sensor fusion", Jun. 28, 2019 (Year: 2019).*
(Continued)

*Primary Examiner* — Russell Frejd
*Assistant Examiner* — Brittany Renee Peko

(57) ABSTRACT

A moving target following method, which is executed by one or more processors of a robot that includes a camera and a sensor electrically coupled to the one or more processors, includes: performing a body detection to a body of a target based on images acquired by the camera to obtain a body detection result; performing a leg detection to legs of the target based on data acquired by die sensor to obtain a leg detection result; and fusing the body detection result and the leg detection result to obtain a fusion result, and controlling the robot to follow the target based on the fusion result.

20 Claims, 13 Drawing Sheets

(51) Int. Cl.
*G06N 3/08* (2023.01)
*G06V 40/10* (2022.01)
*G06V 40/16* (2022.01)

(52) U.S. Cl.
CPC .......... *G06V 40/103* (2022.01); *G06V 40/172* (2022.01)

(58) Field of Classification Search
CPC ........ G06N 3/08; G06N 3/008; G06V 40/103; G06V 40/172; G06V 40/161; G06V 20/10
See application file for complete search history.

(56) References Cited

U.S. PATENT DOCUMENTS

| | | | |
|---|---|---|---|
| 2021/0048829 A1* | 2/2021 | Deyle | G05D 1/0246 |
| 2022/0055212 A1* | 2/2022 | Pong | B25J 9/1664 |
| 2022/0108104 A1* | 4/2022 | Sha | G06K 9/00288 |
| 2022/0241970 A1* | 8/2022 | Lee | B25J 9/1666 |

OTHER PUBLICATIONS

G. Yan, J. Shi, Z. Yu and J. Wang, "Human tracking based on vision and laser sensor," 2017 IEEE International Conference on Unmanned Systems (ICUS), Beijing, China, 2017, pp. 177-181, doi: 10.1109/ICUS.2017.8278336. (Year: 2017).*
ISR for PCT/CN2022/084266.
Written opinions of ISA for PCT/ON2022/084266.

* cited by examiner

| Sensor \ Camera | The target is detected | The target is not detected |
|---|---|---|
| The target is detected | Detection result of the sensor (if distance is less than a preset target range) Detection result of the camera (if distance is not less than a preset target range) | Detection result of the sensor |
| The target is not detected | Detection result of the camera | No existence of the target |

FIG. 10

MOVING TARGET FOLLOWING METHOD, ROBOT AND COMPUTER-READABLE STORAGE MEDIUM

TECHNICAL FIELD

The present disclosure generally relates to mobile robots, and particularly to a method for controlling a mobile robot to follow a moving target.

BACKGROUND

Human following scenarios arise when a human and an autonomous robot collaborate on a common task that requires the robot to follow the human. Usually, the human leads the task and cooperates with the robot during task execution. An example application would be the service robots, which are widely used in industrial applications, e.g., in manufacturing, warehousing, and health care. The use of companion robots in surveillance, social interaction, and medical applications has also flourished over the last decade. Numerous new applications are also emerging in the entertainment industry as robots are getting more accessible for personal use.

Some of these human following robots are required to work in an environment where there are non-target humans and obstacles around the target human, such as sen ice robots designed to carry luggage at airports. One challenge for these robots is that they may lose their target human or follow a wrong target human due to the interference from the non-target humans and/or obstacles in the environment.

Therefore, there is a need to provide a method and a robot to overcome the above-mentioned problem.

BRIEF DESCRIPTION OF DRAWINGS

Many aspects of the present embodiments can be better understood with reference to the following drawings. The components in the drawings are not necessarily draw n to scale, the emphasis instead being placed upon clearly illustrating the principles of the present embodiments. Moreover, in the drawings, all the views are schematic, and like reference numerals designate corresponding parts throughout the several views.

FIG. 10 is a table showing fusion result based on a checked body detection result and a checked leg detection.

DETAILED DESCRIPTION

Figure 1:
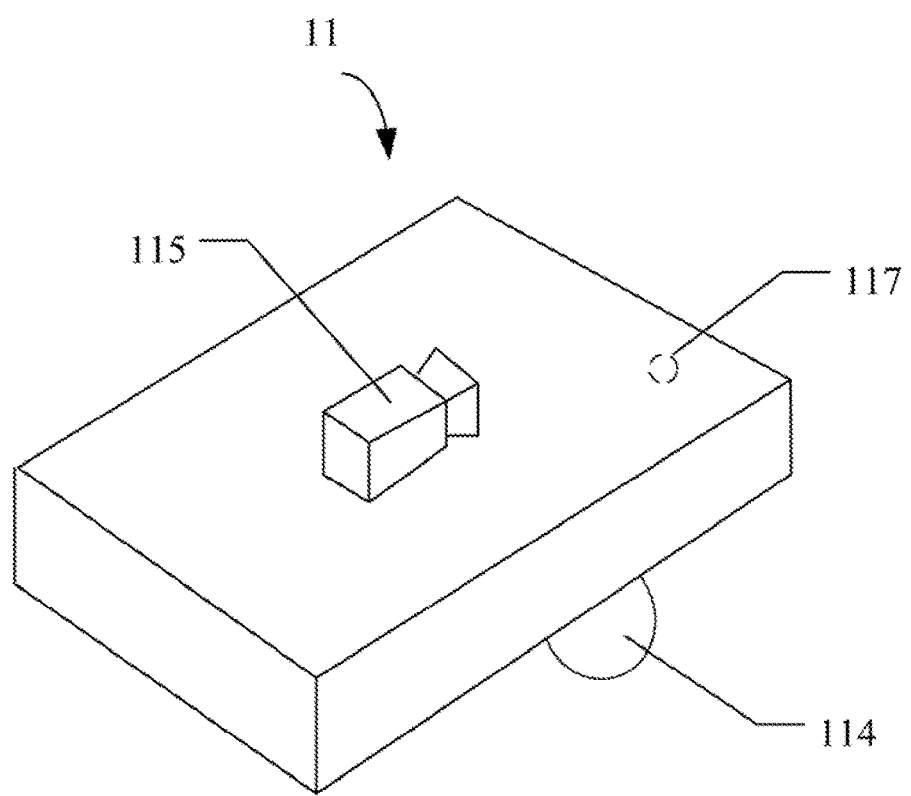
FIG. 1 is a schematic view of a mobile robot according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

Referring to FIG. 1, a robot 11 having moving target following capability of the present disclosure can be a ground mobile robot (e.g., a nonholonomic mobile robot). The robot 11 can operate in various application environments, such as hospitals, factories, warehouse, malls, streets, airports, home, elder care centers, museums, restaurants, hotels, and even wild fields, etc. The robot 11 is designed to have the ability to closely and fast follow a person in both obstacle free and cluster environments. However, the example of FIG. 1 is merely an illustrative example. The robot 11 having moving target following capability may be other types of robots, and the moving target that the robot 11 is designed to follow is not limited to a human, and may be four legged animals, such as dogs, cats, etc.

Figure 2:
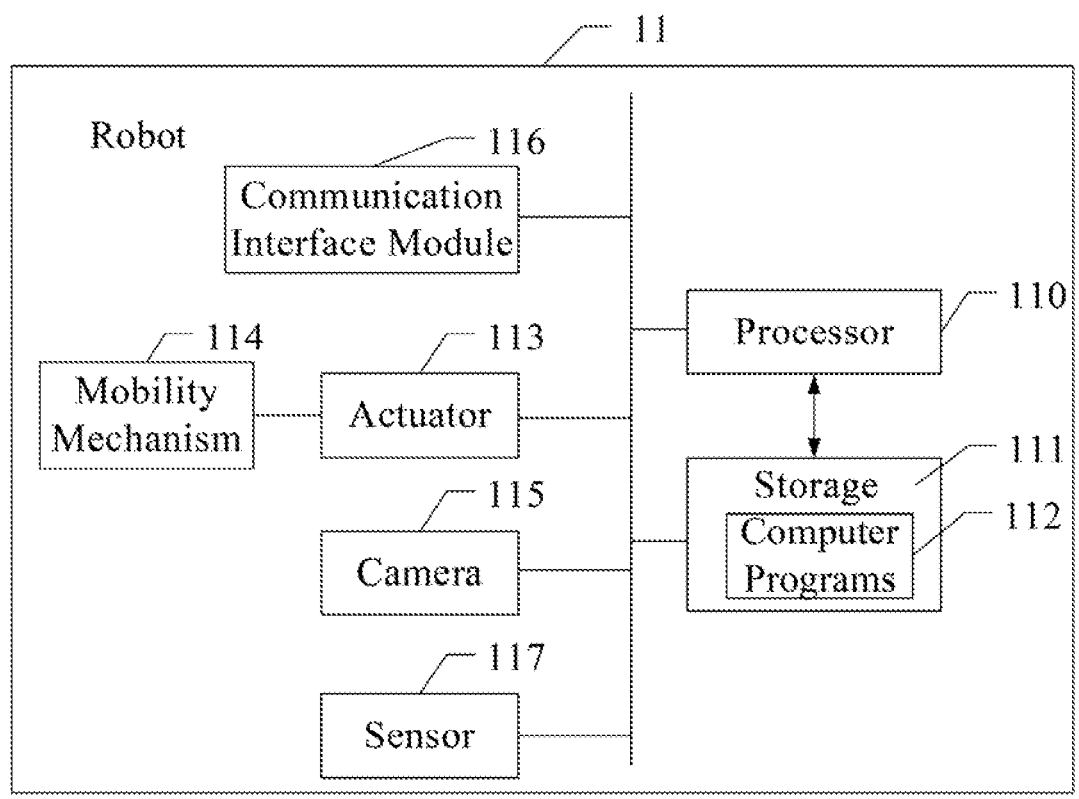
FIG. 2 is a schematic block diagram of the robot according to one embodiment.
Figure 11:
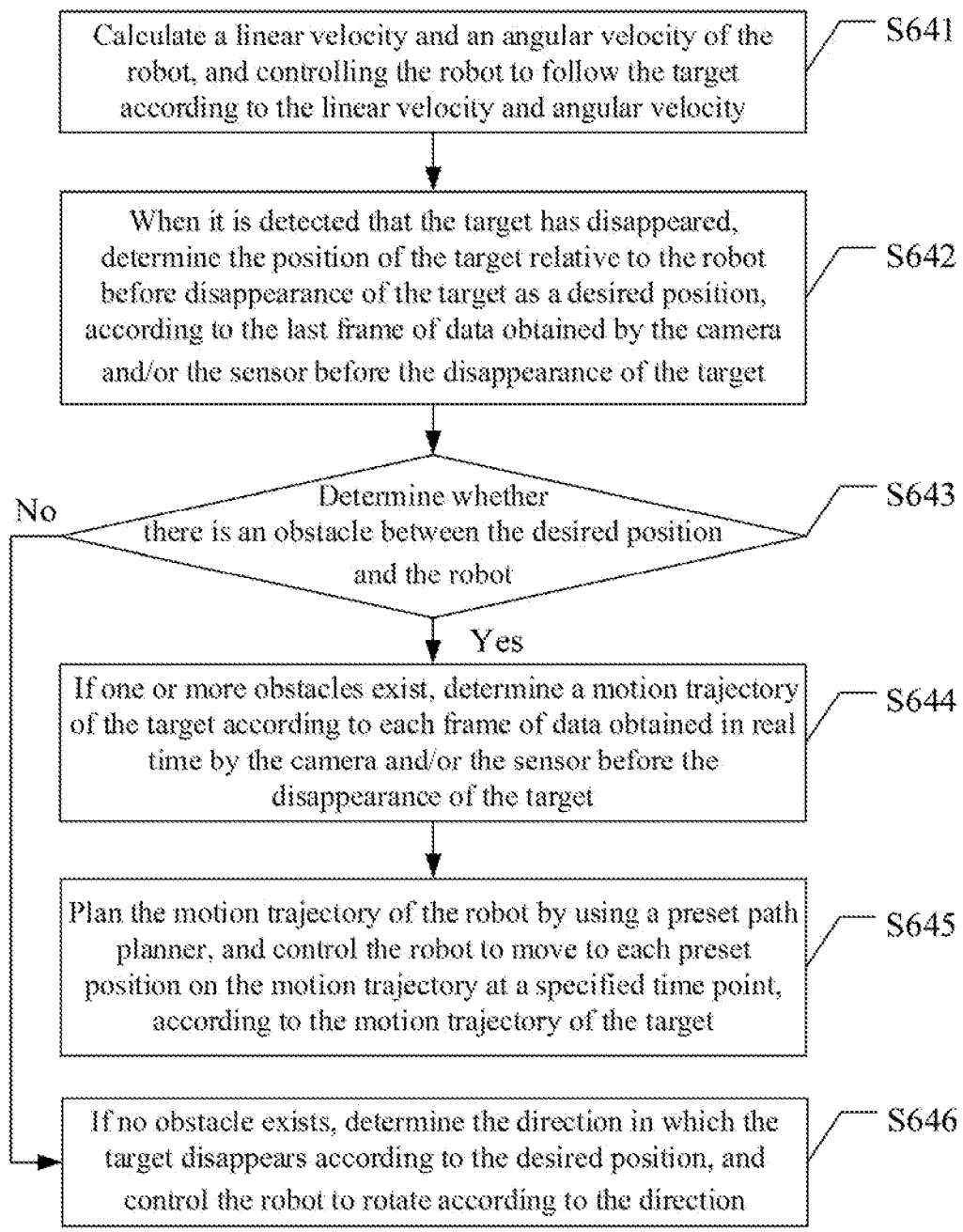
FIG. 11 is a schematic flowchart of a method for control the method to follow the detected target.

Referring to FIG. 2, the robot 11 may include a processor 110, a storage 111, and one or more computer programs 112 stored in the storage 111 and executable by the processor 110. When, the processor 110 executes the computer programs 112, the steps in the embodiments of the method for controlling the robot 11, such as steps S51 to S53 in FIG. 5, steps S61 through S54 in FIG. 6, steps S611 through S614 in FIG. 7, steps S631 to S633 in FIG. 8, steps S635 to S638 in FIG. 9, and steps S641 to S646 in FIG. 11, are implemented.

The processor 110 may be a central processing unit (CPU), a general purpose processor, a digital signal processor (DSP), an application specific integrated circuit (ASIC), a field-programmable gate array (FPGA), a programmable logic device, a discrete gate, a transistor logic device, or a discrete hardware component. The general purpose processor may be a microprocessor or any conventional processor or the like.

The storage 111 may be an internal storage unit of the robot 11, such as a hard disk or a memory. The storage 111 may also be an external storage device of the robot 11, such as a plug-in hard disk, a smart memory card (SMC), and a secure digital (SD) card, or any suitable flash cards. Furthermore, the storage 111 may also include both an internal storage unit and an external storage device. The storage 111 is used to store computer programs, other programs, and data required by the robot. The storage 111 can also be used to temporarily store data that have been output or is about to be output.

Exemplarily, the one or more computer programs 112 may be divided into one or more modules/units, and the one or more modules/units are stored in the storage 111 and executable by the processor 110. The one or more modules/units may be a series of computer program instruction segments capable of performing specific functions, and the instruction segments are used to describe the execution process of the one or more computer programs 112 in the robot 11.

In one embodiment, the robot 11 may further include an actuator 113, a mobility mechanism 114, a camera 115, a communication interface module 116, and a sensor 117. It should be noted that FIG. 2 is merely an example of the robot 11, and does not limit the robot 11. The robot 11 may include components different in numbers from those illustrated, or incorporate some other different components. For example, the robot 11 may further include an input and output device, a network access device, a bus, and the like.

In one embodiment, the actuator 113 may include one or more motors and/or servos. The mobility mechanism 114 may include one or more wheels and/or tracks. The actuator 113 is electrically coupled to the mobility mechanism 114 and the processor 110, and can actuate movement of the mobility mechanism 114 according to commands from the processor 110. The camera 115 may be, for example, a camera mounted on the robot 11. The camera 115 is electrically coupled to the processor 110 and is configured to transmit captured images to the processor 110. The communication interface module 116 may include a wireless transmitter, a wireless receiver, and computer programs executable by the processor 110. The communication interface module 116 is electrically connected to the processor 110 and is configured for communication between the processor 110 and external devices. The sensor 117 may be a 2D lidar sensor, a sonar sensor, an infrared sensor and the like, in one embodiment, the processor 110, storage 111, actuator 113, mobility mechanism 114, camera 115, communication interface module 116, and the sensor 117 may be connected to one another by a bus.

Figure 3:
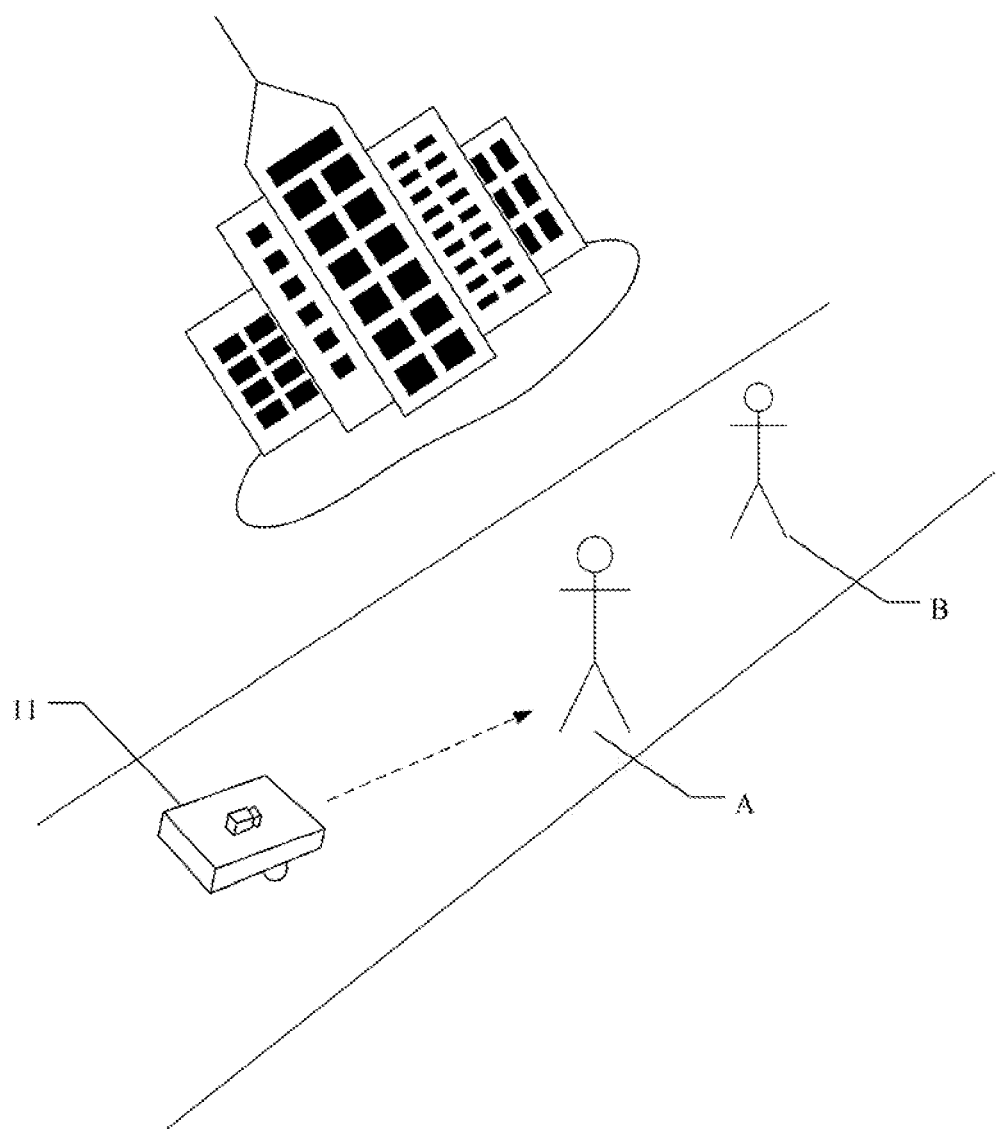
FIG. 3 is a schematic diagram showing an exemplary scenario where the robot operates in an outdoor environment.
Figure 4:
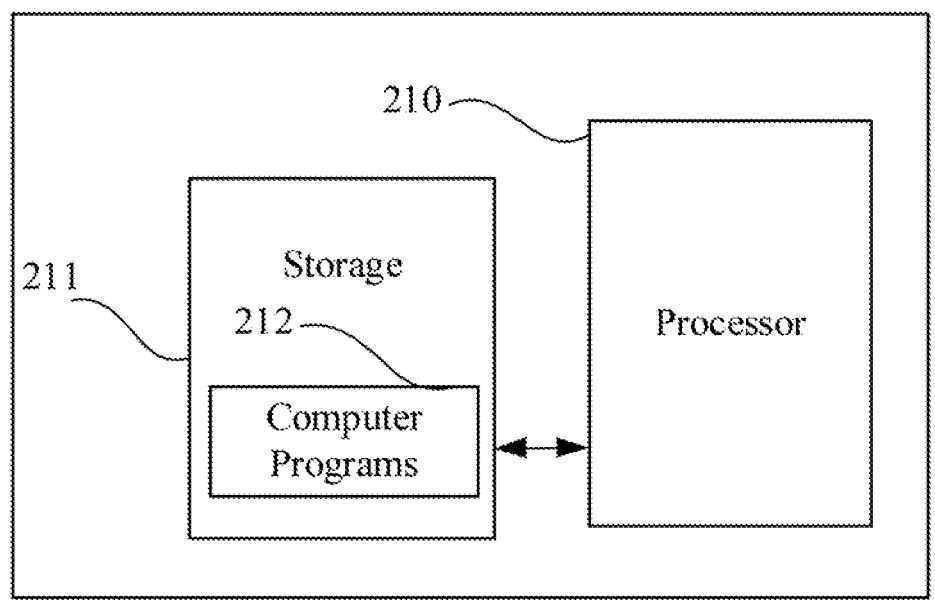
FIG. 4 is to schematic block diagram of a control device according to one embodiment.
Figure 5:
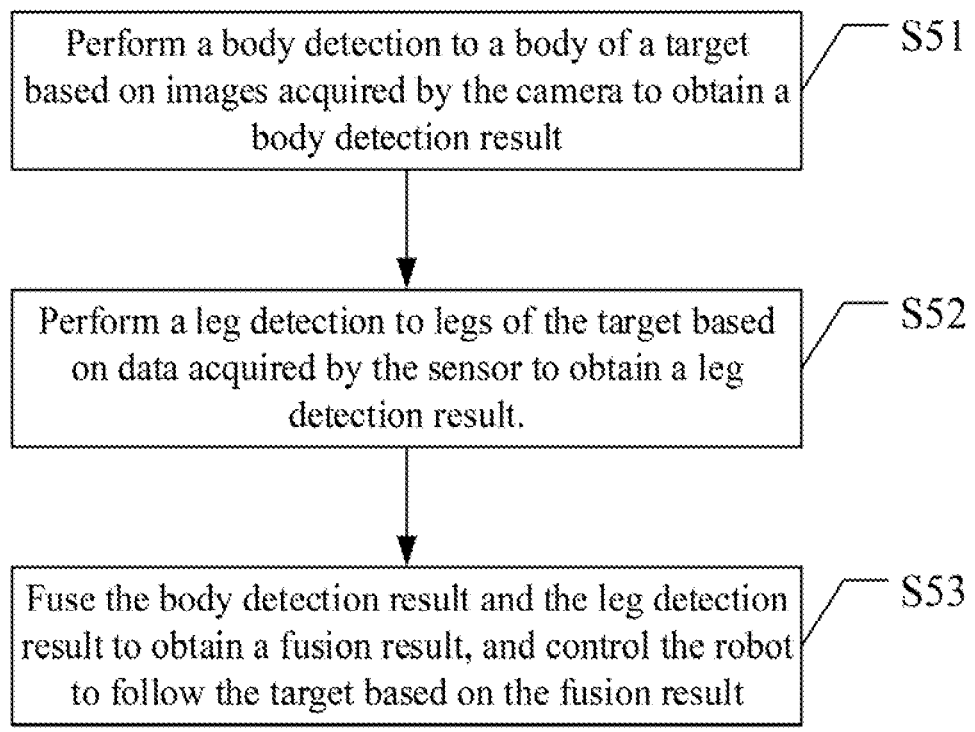
FIG. 5 is a schematic flowchart of a moving target following method according to one embodiment.

In an exemplary scenario as shown in FIG. 3, the robot 11 is designed to operate in an outdoor environment. FIG. 5 shows a flowchart of a following method according to one embodiment. The method may be executed by one or more processors of the robot 11 or one or more processors of other control devices electrically coupled to the robot. The robot 11 and the control devices can be collectively referred to as robot control devices. The control devices may include, but are not limited to: desktop computers, tablet computers, laptop computers, multimedia players, servers, smart mobile devices (such as smart phones, handheld phones, etc.) and smart wearable devices (such as smart watches, smart classes, smart cameras, smart bands, etc.) and other computing devices with computing and control capabilities, Referring to FIG. 4, the control devices may include a processor 210, a storage 211, and one or more computer programs 212 stored in the storage 211 and executable by the processor 210. When the processor 110 executes the computer programs 112, the steps in the embodiments of the method for controlling the robot 11, such as steps S51 to S53 in FIG. 5, steps S61 through S64 in FIG. 6, steps S611 through S614 in FIG. 7, steps S631 to S633 in FIG. 8, steps S635 to S638 in FIG. 9, and steps S641 to S646 in FIG. 11 are implemented. In one embodiment, the method may include steps S51 to S53.

Step S51: Performing a body detection to a body of a target based on images acquired by the camera 115 to obtain a body detection result.

Specifically, the one or more processors above use image recognition technology to recognize the target in the images captured by the camera 115 in real time, so as to perform the body detection to the body of the target. If the target is recognized in the images, the position information of the target is acquired as the body detection result. If the target is not recognized in the images, it is determined that the target is not detected. The target may be a human or a four-legged animal, such as a dog, a cat, etc.

Step S52: Performing a leg detection to legs of the target based on data acquired by the sensor 117 to obtain a leg detection result.

In one embodiment, the sensor 117 may include, but not be limited to, a lidar sensor, a sonar sensor, or an infrared sensor. The one or more processors above obtains the data generated by the sensor 117 in real time, and perform the leg detection to legs of the target based on the obtained data. If the legs of the target are detected based on the obtained data, the position information of the legs of the target is acquired as the leg detection result. If the legs of the target are detected based on the obtained data, it is determined that the target is not detected.

Step S53: Fusing the body detection result and the leg detection result to obtain a fusion result, and controlling the robot 11 to follow the target based on the fusion result.

If both the body detection result and the leg detection result show that the target is not detected, the robot 11 is not Controlled to perform as following operation. If one of the body detection result and the leg detection result shows that the target is detected, the robot 11 is controlled to perform a following operation according to the one of the body detection result and the leg detection result. If both the body detection result and the leg detection result show that the target is detected, the robot 11 is controlled to perform a following operation according to the distance between the target and the robot 11, based on one of the body detection result and the leg detection result that best matches the distance.

Figure 6:
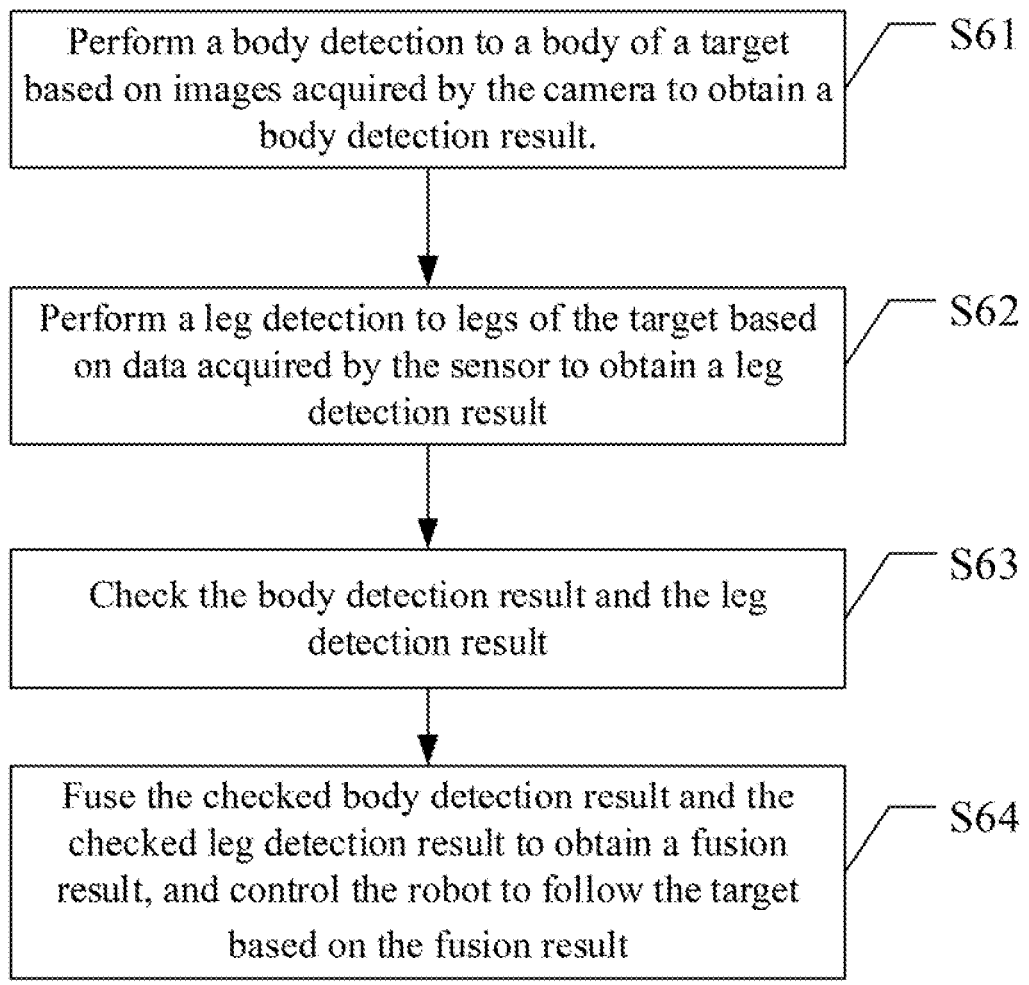
FIG. 6 is a schematic flowchart of a moving target following method according to another e embodiment.

FIG. 6 shows a flowchart of a following method according to another embodiment. The method may include the steps S61 to S64.

Step S61: Performing a body detection to a body of a target based on images acquired by the camera 115 to obtain a body detection result.

Figure 7:
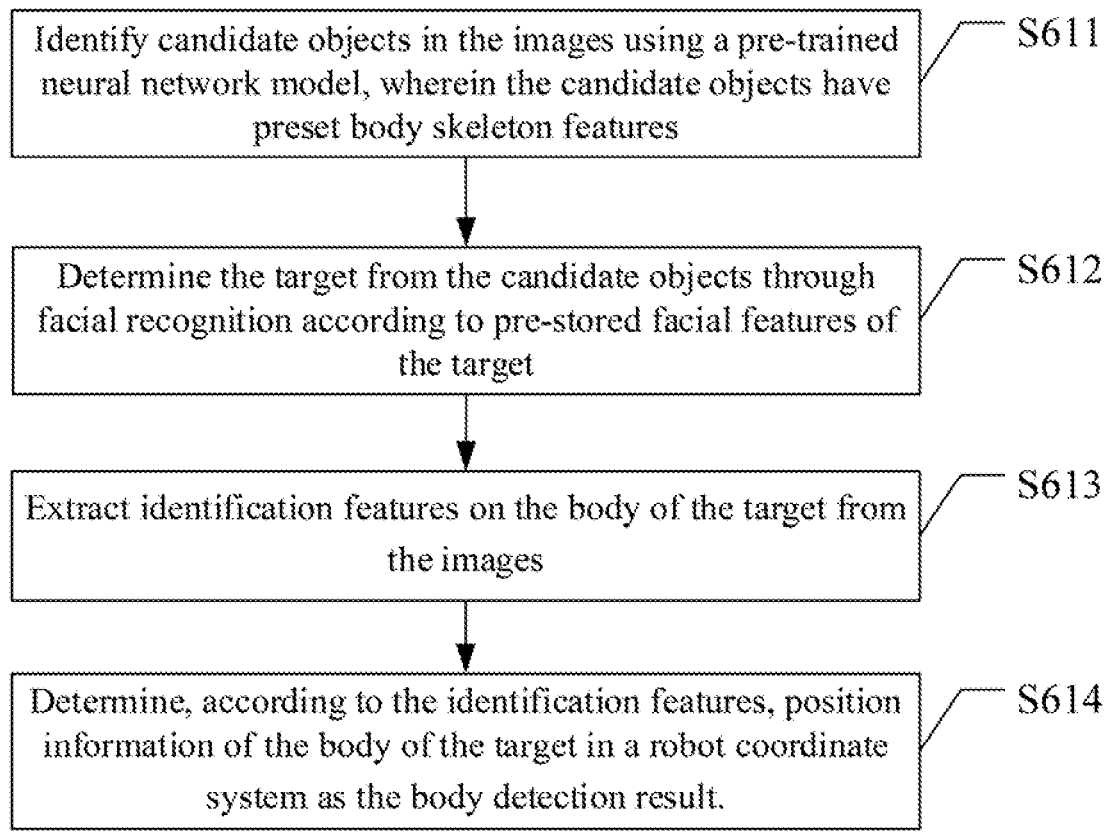
FIG. 7 is a schematic flowchart of a method for performing a body detection according to one embodiment.

In one embodiment, the camera 115 may be an RGB-Depth camera. The target may be a human or a four-legged animal, such as a dog, a cat, etc. Referring to FIG. 7, in one embodiment, step S61 may specifically include the following steps.

Step S611: Identifying candidate objects in the images using a pre-trained neural network model, wherein the candidate objects have preset body skeleton features.

Step S612: Determining the target from the candidate objects through facial recognition according to pre-stored facial features of the target.

Step S613: Extracting identification features on the body of the target from the images.

Step S614: Determining, according to the identification features, position information of the body of the target in a robot coordinate system as the body detection result.

In one embodiment, the preset body skeleton features may include head, shoulders, arms, body and legs features. The detailed process of steps S611 to S614 are as follows. Specifically; the color images with depth information captured by the camera 115 are input into a pre-trained neural network model, such as the trt_pose algorithm for human pose estimation. The pre-trained neural network model is used to identify at least one candidate object in the color images by detecting the body skeleton with features such as head, shoulders, arms, body, and legs in the color images. If no candidate objects exist in the color images, it is determined that the body detection result is that the target is not detected. If there is one or more candidate objects in the color image, the facial features of each candidate object in the color images are extracted, and the extracted facial features are matched with the preset facial features of the target. If the matching degree between the extracted facial features and the facial features of the target is less than a preset matching degree, it is determined that the body detection result is that the target is not detected. If the matching degree between the extracted facial features and the facial features of the target is equal to or greater than the preset matching degree, the candidate object corresponding to the facial features with the highest matching degree is determined as the target. Then, identification features on the body of the target, which distinguish the target from other objects in the color images, are extracted from the color images. The identification features are features of the target except for the face and body skeleton of the target. The identification features can include, but are not limited to, for example: the color, texture, and text on the clothes of the target, the decorations on the target, or the appearance characteristics of the target, etc. Finally, the position information of the body of the target in the robot coordinate system is obtained as the body detection result according to the external parameters of the camera (i.e., the relative pose) relative to the robot coordinates.

Step S62: Performing a leg detection to legs of the target based on data acquired by the sensor 117 to obtain a leg detection result.

In one embodiment, the sensor 117 may be an on-board 2D lidar sensor, and the data acquired by the sensor 117 are 2D lidar data. In this case, the position information of the legs of the target is determined as the leg detection result according to the 2D lidar data obtained by the 2D lidar sensor in real time. Mere, the position information of the legs is the two-dimensional position information in the robot coordinate system. Descriptions are now made by taking a human target as an example, f irst, the two-dimensional point cloud obtained by the 2D lidar sensor is segmented to obtain multiple continuous line segments. The length and arc of each continuous line segment is then determined. Some of the line segments, which have a shape similarity to the legs of the target greater than a preset first similarity degree, are retained to obtain multiple candidate legs. Then, the candidate legs are further identified in the same manner. At least two legs, whose shape similarity to each other is greater than a preset second similarity degree and the distance between which is greater than a preset distance, are determined as belonging to the same object. The position information of the legs of the target is determined based on the position information of the at least two legs as the leg detection result. In one embodiment, the position information of one of the at least two legs may be determined as the leg detection result, or the position information of the center positions of the at least two legs may be determined as the leg detection result.

If the candidate legs are not obtained according to the recognition result, it is determined that the leg detection result is that the target is not detected. It should be noted that when multiple objects stay within the sensing range of the sensor 117, since it is difficult to distinguish the similar shapes of the legs, the number of the targets determined according to the sensing data of the sensor 117 may be multiple.

Step S63: Checking the body detection result and the leg detection result.

In order to further reduce the likelihood of target missing and improve the following efficiency, the one or more processors above check the body detection result and the leg detection result before fusing the body detection result and the leg detection result.

Figure 8:
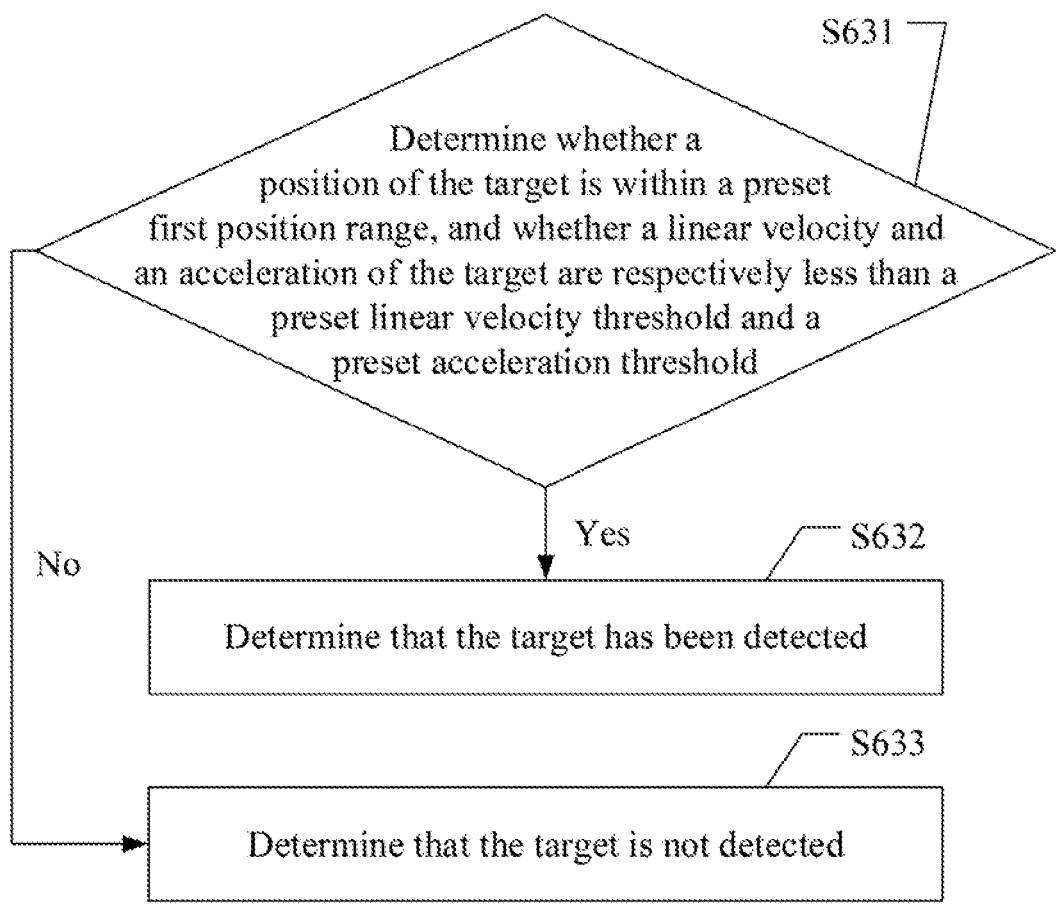
FIG. 8 is a schematic flowchart of a method for checking a body detection result according to one embodiment.

Referring to FIG. 8, in one embodiment, checking the body detection result includes the following steps S631 to S633.

Step S631: Determining, according to the body detection result, whether a position of the target is within a preset first position range, and whether a linear velocity and an acceleration of the target are respectively less than a preset linear velocity threshold (e.g., 1.2 m/s) and a preset acceleration threshold (e.g., 9 m/s$^2$).

In one embodiment, the preset first position range is the best field of view and the best range of operation of the camera 115, and can be, for example, five meters. The body detection result is coarsely filtered through the preset first position range, which can avoid recognition errors.

Step S632: that the target has been detected if the position of the target is within the preset first position range, and the linear velocity and the acceleration of the target are respectively less than the preset linear velocity threshold and the preset acceleration threshold.

Step S633: Determining that the target is not detected if the position of the target is not within the preset first position range, or the linear velocity and the acceleration of the target are not less than the preset linear velocity threshold and the preset acceleration threshold, respectively.

Figure 9:
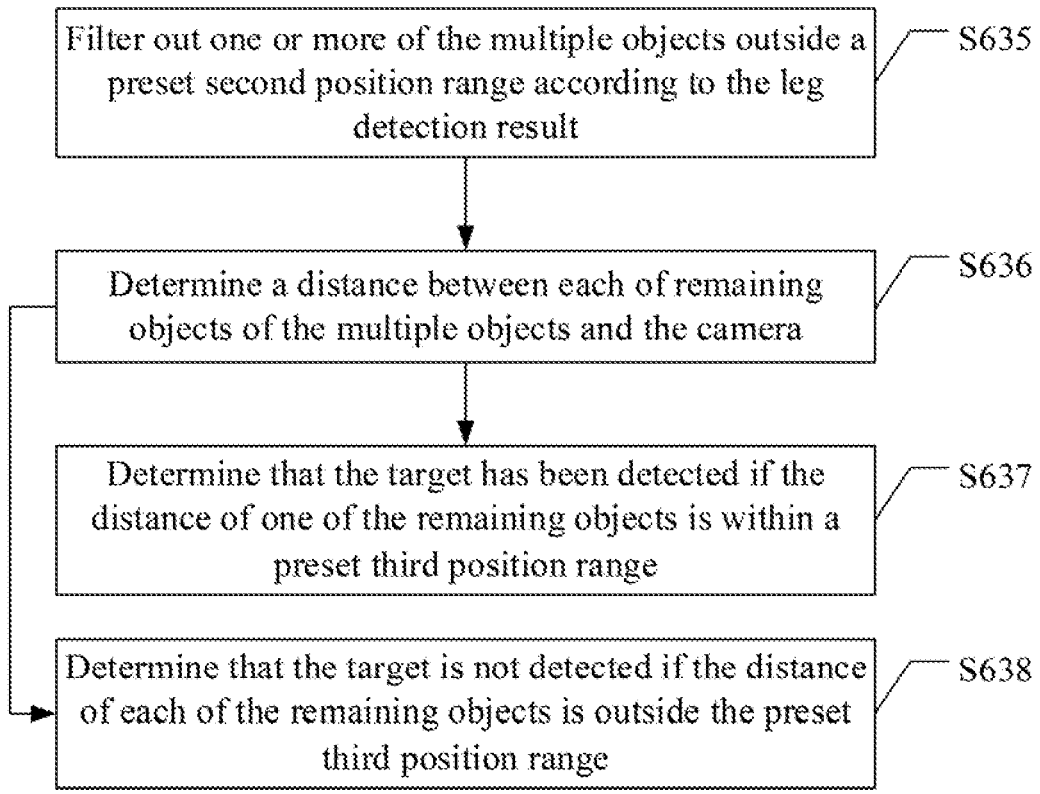
FIG. 9 is a schematic flowchart of a method for checking a leg detection result according to one embodiment.

In one embodiment, the leg detection result includes position information of multiple objects. In one embodiment, the leg detection result is checked in combination with the body detection result. As shown in FIG. 9, the checking of the leg detection result may include the following steps S635 to S638.

Step S635: Filtering out one or more of the multiple objects outside a preset second position range according to the leg detection result.

In one embodiment, the preset second position range is the best range of operation of the sensor 117, and can be, for example, three meters. The detection data of the sensor is filtered by the preset second position range to avoid misrecognition caused by too many point clouds in the distance and too cluttered environment, which can avoid increasing the amount of computation.

Step S636: Determining a distance between the remaining object of the multiple objects and the camera 115.

Step S637: Determining, that the target has been detected if the distance between the remaining object and the camera 115 is within a preset third position range. In one embodiment, the third position range can be the maximum tolerance range, that is, the approximate radius of a circle surrounding a standing human, which can be, for example, 0.3 meters.

Step S638: Determining that the target is not detected if the distance between the remaining object and the camera 115 is outside the preset third position range.

In one embodiment, the distance between the remaining object of the multiple objects and the camera 115 can be determined as follows.

After the body skeleton of the remaining object in the color image taken by the RGB-D camera is recognized using the pre-trained neural network model, the positions of the shoulder centers in the body skeleton on the color image are calculated. The depth information is then obtained through the depth channel of the camera 115, and the distance between the remaining object and the camera 115 is determined according to the depth information.

If there are still multiple objects remaining after step S635, the position information of each remaining object in the leg detection result is compared with the position information of the target in the body detection result, so as to obtain the difference between the positions of each remaining object and the target in the body detection result. Then, among the remaining objects, the objects whose position difference is less than the preset threshold are filtered out, so that only the position information of one object is retained in the leg detection result.

After the target moves, the trajectory of the target is predicted by using EKF (Extended Kalman Filter, Extended Kalman Filter) to achieve the target tracking focus, so as to avoid target losing during the following process.

Since the results of lidar sensors are usually more accurate than those of cameras, and the War sensors have smaller noise is smaller and a wider field of view (e.g., 270 degrees), the accuracy of target detection results can be improved by combining laser detection with image detection.

Step S64: Fusing the checked body detection result and the checked leg detection result to obtain a fusion result, and controlling the robot 11 to follow the target based on the fusion result.

Referring to the table shown in FIG. 10, if both the checked body detection result and the checked leg detection result show that the target is not detected, it is determined that the target is not detected and the robot 11 is controlled not to perform a following operation.

If one of the body detection result and the leg detection result shows that the target is detected, the robot 11 is controlled to perform a following operation according to the one of the body detection result and the leg detection result.

If both the body detection result and the leg detection result show that the target is detected the robot 11 is controlled to perform a following operation according to the leg detection result when the distance between the target and the robot 11 lies within a preset target range; and the robot 11 is controlled to perform a following operation according to the leg detection result when the distance between the target and the robot 11 lies outside the preset target range.

Referring to FIG. 11, controlling the robot to follow the target may include the following steps S641 to S646.

Step S641: Calculating a linear velocity and an angular velocity of the robot 11, and controlling the robot 11 to follow the target according to the linear velocity and angular velocity.

Figure 12:
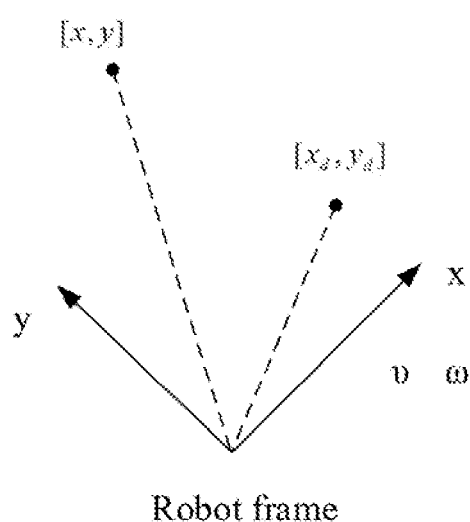
FIG. 12 is schematic diagram of a robot coordinate system.

Specifically, if the detection result shows that the target has been detected, a direct tracking mode is activated. In the direct tracking mode, the linear velocity and angular velocity of the robot 11 is calculated according to the fusion result, and the robot 11 is controlled to follow the target according to the linear velocity and angular velocity. In FIG. 12, [x, y] is the coordinates of the target in the robot coordinate system. The control goal of preset contra controller of the robot 11 is to generate appropriate linear and angle rte to ensure that the target remains at the present position $[x_d, y_d]$ in the robot coordinate system.

In one embodiment, the controller of the robot 11 is defined according to a formula below $$\begin{bmatrix} v_x \\ \omega \end{bmatrix} = -J^{-1} \begin{bmatrix} PID(e_x) \\ PID(e_y) \end{bmatrix},$$

where $e_x = x - x_d$, $e_y = y - y_d$, $e_x$ is the difference in x coordinates between inns iai the robot coordinate system, $e_y$ is the difference in y coordinates between two points in the robot coordinate systen, PID( ) represents a PID control module, an J is a Jacobian matrix. In one embodiment, J is defined according to a formula below:

$$J = \begin{bmatrix} -1 & y \\ 0 & -x \end{bmatrix},$$

where y and x represent the coordinate points in the robot coordinate system shown in FIG. 12.

In the direct tracking node, since there is no need to plan the moving path of the robot, the algorithm can be simplified, the calculation burden can be reduced, and fast calculation and dynamic response can lit, achieved.

Step S642: When it is detected that the target has disappeared, determining the position of the target relative to the robot 11 before disappearance of the target as a desired position, according to the last frame of data obtained by the camera and/or the sensor before the disappearance of the target. The last frame of data is the last frame of valid measurement values acquired by the camera and/or the sensor.

Step S643: Determining whether there is an obstacle between the desired position and the robot 11 for example, by checking if there is an obstacle on a straight line between the desired position and the robot 11.

Step S644: If one or more obstacles exist, determining a motion trajectory of the target according to each frame of data obtained in real time by the camera and/or the sensor before the disappearance of the target.

Step S645: Planning the motion trajectory of the robot 11 by using a preset path planner, and controlling the robot 11 to move to each preset position on the motion trajectory at a specified time point by using a preset tracking controller, according to the motion trajectory of the target.

Specifically, when it is detected that the target has disappeared, the position of the target relative to the robot in the last frame of data obtained by the camera and/or the sensor before the disappearance of the target is obtained. The position is marked as the desired position on a preset map. The camera and/or the sensor are then used to determine whether there is an obstacle on a line between the desired position and the robot. The sensor may be a 2D lidar sensor, a sonar sensor or an infrared Sensor.

If there is an obstacle (e.g., a wall) between the robot and the desired position, meaning that the target may disappear at a corner, and a trajectory tracking mode is then started. In the trajectory tracking mode, the position of the target relative to the robot in each frame of data obtained in real time by the camera and/or the sensor before the disappearance of the target is marked on the map to obtain the motion trajectory of the target. The speed of the target is then determined according to the position of the target relative to the robot in each frame of data obtained in real time by the camera and/or the sensor before the disappearance of the target. Then, the preset path planner predicts the next moving direction and moving position of the target based on the motion trajectory and the speed of the last position of the target on the trajectory. The motion trajectory of the robot within a preset range (e.g., 2 meters) is replanned according to the prediction result, the current pose of the robot, and the obstacles between the target and the robot, so as to ensure that the given path meets the robot's kinematics, dynamics, and non-holonomic constraints. Finally, a preset tracking controller is used to control the robot to reach each preset position on the predicted motion trajectory at a specified time point.

It should be noted that the motion trajectory of the target is actually a path along which the target moves without bumping into obstacles. There is noise in this path. In order to improve the accuracy of the planning result, low-pass filtering can be used to smooth the motion trajectory, and an interpolation (e.g., B-slim method) is used to obtain denser points for tracking.

In one embodiment, the preset path planner can plan the motion trajectory of the robot using, for example, dynamic window approach (DWA), where DWA can be used to plan a local motion trajectory, and can also be used to optimize the motion trajectory.

The control goal of the preset tracking controller is to ensure that the robot can reach each determined position at a specified time point. The tracking, controller may calculate the linear velocity of, the robot using the following formula:

$$\begin{bmatrix} v_x \\ v_y \end{bmatrix} = \begin{bmatrix} PID(e_x) + v_{tx} \\ PID(e_y) + v_{ty} \end{bmatrix},$$

where $v_x$ is the commanded linear velocity of the robot, $e_x$ and $e_y$ here represent the distance between each position on the planned motion trajectory of the robot and the current position of the robot, $v_x$ and $v_x$ are the linear velocities of the positions in relation to the odometry frame expressed by the body frame (i.e., robot coordinate system or robot frame). The command angle of the robot is $\theta=\arctan(v_y/v_x)$. The angular velocity command of this robot needs to reduce the rake angle error ($e_\theta=\theta-0$) to 0. The tracking controller is defined by the following formula: $\omega=PID(e_\theta)$.

In one embodiment, after the robot reaches the end of the motion trajectory, if the target is detected, the robot can be controlled to operate in the direct tracking mode again. However, after the robot reaches the end of the motion trajectory, if the target is not detected, motion of the robot is stopped.

In one embodiment, in the process of controlling the robot to reach each preset position on the predicted motion trajectory at a specified time point using the preset tracking controller, an obstacle avoidance module can also be used to control the robot to avoid obstacles. The obstacle avoidance module uses an algorithm based on potential field or vector field to calculate the target position to be reached by the robot, and controls the movement of the robot according to the target position to be reached, so as to realize obstacle avoidance. The algorithm above will be executed at a high rate and check every frame of data obtained by the camera and/or the sensor in real time.

Under the idea of potential field, a robot is considered as a particle that is under the influence of an artificial potential field whose local variations reflects the free space structure and it depends on the obstacles and the desired position that the robot needs to reach. The potential field function is defined as the sum of an attraction field that push the robot to the desired position and a repulsive field that take it away from the obstacles. In one embodiment, the attraction field is calculated according to a formular below: $U_a=\xi\frac{1}{2}\|q-q_d\|^2$, where $\xi$ is the gain, q is the position (x, y) of the robot, and $q_d$ is the desired position of the robot. The repulsive field is calculated according to a formular below:

$$U_r = \frac{1}{2}v\left(\frac{1}{\rho(q,q_b)} - \frac{1}{\rho_{min}}\right)^2,$$

where v the gain, $\rho(q,q_b)$ represents the point cloud closest to the robot among all obstacle point clouds, $\rho_{min}$ is the threshold. It should be noted that the repulsive field is calculated according to the formular above when $\rho(q,q_b) \leq \rho_{min}$. If $\rho(q,q_b)$ is greater than $\rho_{min}$, the distances between the obstacle point clouds and the robot are greater than the threshold, and the repulsive field is equal to zero $U_r=0$ because the obstacle point clouds are ignored.

It should, be noted that the gain in the formulas above is adjustable, and can be automatically adjusted by a processor according to the robot size, maximum speed, and minimum obstacle distance in practical applications. In one embodiment, the potential field force is calculated according, to the formula below: $F=-d(U_a+U_r)/dt$. That is, the potential field force is the gradient of the potential field, "the linear velocity and angular velocity of" the robot are adjusted along the gradient, that is, $(\dot{x},\dot{y})=-d(U_a+U_r)/dt$. The velocity of the robot includes linear velocity and angular velocity, i.e., the $v_k$ and $v_y$ in formula $$\begin{bmatrix} v_x \\ v_y \end{bmatrix} = \begin{bmatrix} PID(e_x) + v_{tx} \\ PID(e_y) + v_{ty} \end{bmatrix},$$

The linear velocity and angular velocity calculated according to the formula above can be refined according to obstacles, for example, by averaging or multiplying the sum of weights. The weight is an adjustable parameter, which can be time-varying or a fixed value. When the weight is time-varying, the weight is a function related to the obstacle distance.

Step S646: If no obstacle exists, determining the direction in which the target disappears according to the desired position, and controlling the robot to rotate according to the direction.

Specifically; if there is no obstacle between the robot and the desired position, it means that the target has left the 270° field of view of the robot. It is likely that the target has walked around behind the robot. In this case, the robot is controlled to operate in a recovery mode. In the recovery mode, according to the direction in which the target disappears, the robot is controlled to rotate. For example, if the target disappears on the left of the robot, the robot is controlled to rotate to the left; and if the target disappears on the tight of the robot, the robot is controlled to rotate to the right.

The above-mentioned direct tracking mode, trajectory tracking mode, and recovery mode respectively correspond to three different operating modes of the robot. In one embodiment, the robot can switch between the three modes through a preset state machine.

In one embodiment, if the target is detected after rotation of the robot, the robot is controlled to operate in the direct tracking mode. If the target is still not detected after rotation of the robot, motion of the robot is stopped.

In one embodiment, a rotation controller for controlling rotation of the robot is defined according to a formula below:

$$v = 0,$$
$$\omega = PID(e_\theta),$$

where the angle error $e_\theta=\theta-0$ and $\theta=\pm\pi$.

Figure 13:
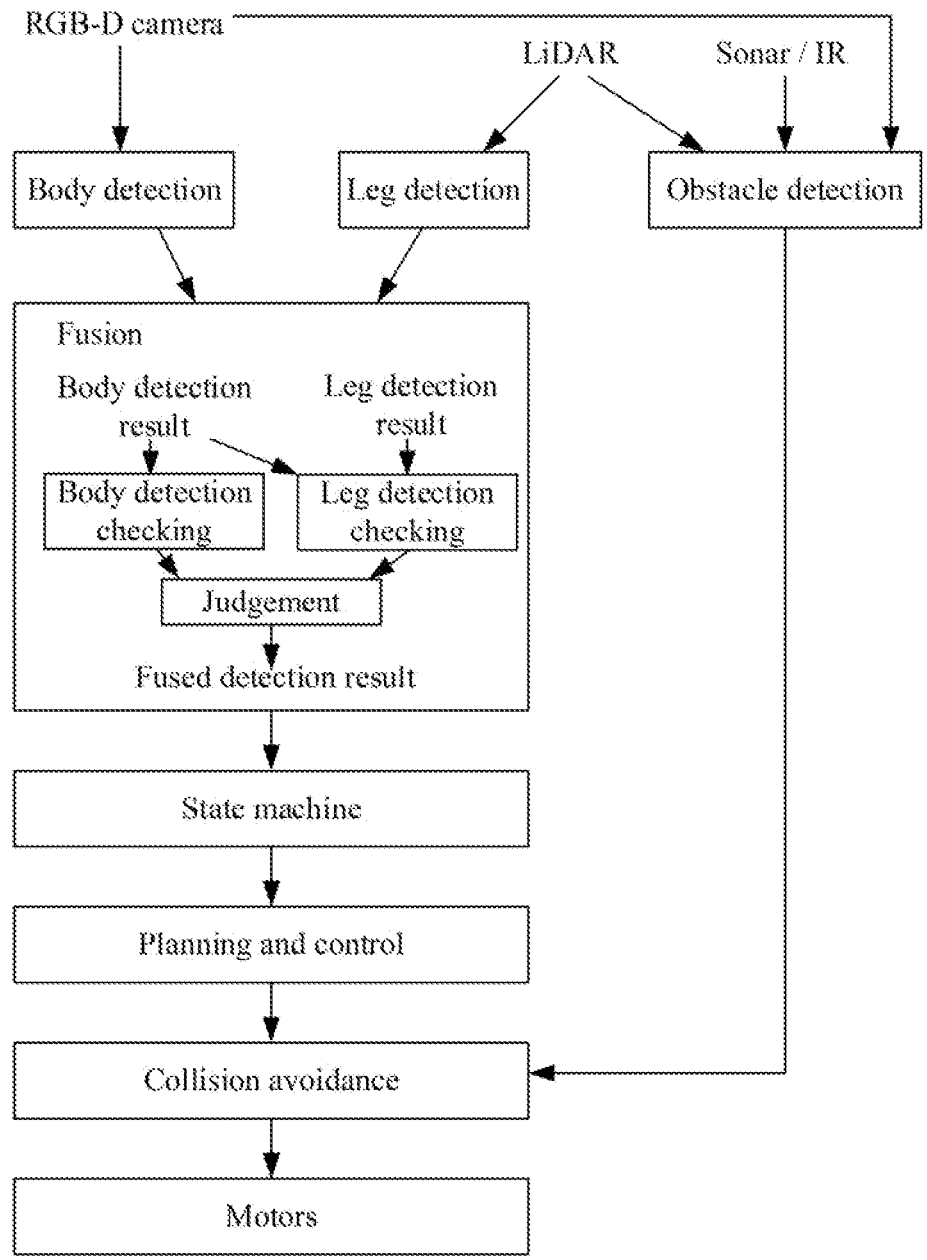
FIG. 13 is a schematic block diagram for implementing the method of FIG. 6.

To further illustrate the method above provided by this disclosure, descriptions are now made in conjunction with FIGS. 3 and 13 and by taking the control of the robot 11 to follow the target person A in FIG. 3 as an example. The robot 11 first uses a body detection module to detect the body of the target person A using the RGB-D camera and obtains the body detection result. In one embodiment, the body detection module may use face recognition for detection, and there is only the position information of the target person A in the body detection result. At the same time, a leg detection module may use a lidar sensor to detect the legs of the target person A and obtains the leg detection result. Since in this scenario there is another person B standing near the target person A, the leg detection module can detect the legs of both the target person A and the person B. Thus, the leg detection result includes the position information of the target person A and the position information of the person R However, person B is not the target that the robot 11 is controlled to follow. The robot 11 then cheeks the body detection result through a body detection verification module, and checks the leg detection result through a leg detection verification module, combined with the body detection result, to ensure that it is following the target person A. A determining module then determines a fusion mode according to the table shown in FIG. 10 according to the checking result, and obtains the fusion result according to the table.

According to the fusion result, the state machine switches the robot 11 to the direct tracking mode, the trajectory tracking mode, or the recovery mode, and the robot 11 performs different following operations in the corresponding mode. For example, when the target person A is detected, the robot 11 is controlled to operate in the direct tracking mode. In this direct tracking mode, a preset controller is called through a planning and control module to calculate the linear velocity and angular velocity of the robot 11, and the robot 11 is driven by one or more drive motors to follow the target person A according to the linear velocity and angular velocity. When the disappearance of the target person A is detected, the robot 11 is controlled to operate in the trajectory tracking module if there is an obstacle between the robot 11 and the target person A. In the trajectory tracking mode, an obstacle detection module uses at least one of an RGB-D camera, a lidar sensor, a sonar, and an IR sensor to detect obstacles between the robot 11 and the target person A. A planning and control module then plans a motion trajectory for the robot 11, the one or more drive motors drives the robot 11 to move according to the motion trajectory, and an obstacle avoidance module controls the robot 11 to move while avoiding obstacles. When the disappearance of the target person A is detected, and there is no obstacle between the robot 11 and the target person A, the robot 11 is controlled to operate in the recovery mode, in which a preset rotation controller is called by the planning and control module to control the robot 11 to rotate in place to find the target person A who has disappeared.

The method according to the embodiments of the present disclosure has the following advantages. Specifically, by combining the camera with other sensors, the advantages of the camera and other sensors can be combined to improve the accuracy of detection and tracking of the target to be followed, which can effectively avoid the situation of following the wrong person and losing the target. In addition, the obstacle avoidance module may use a light algorithm to process sensor data in real time, which can achieve efficient obstacle avoidance in the process of following the target. By using the preset controller and trajectory tracking controller, the rapid response of the robot when tracking dynamic moving targets is ensured. By using the state machine to switch the robot to different operating modes under different following conditions, the robot can, be adapted to a variety of following environments, which can improve flexibility and efficiency.

In one embodiment, a non-transitory computer-readable storage medium is provided. The non-transitory computer-readable storage medium may be configured in the robot 11 shown in FIG. 2 or in the control device shown in FIG. 4. The non-transitory computer-readable storage medium stores executable computer programs, and when the programs are executed by the one or more processors of the robot 11, the target following method described in the embodiments above is implemented.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In one embodiment, a non-transitory computer-readable storage medium that may be configured in the robot 11 or the mobile robot control device as described above. The non-transitory computer-readable storage medium may be the storage unit configured in the main control chip and the data acquisition chip in the foregoing embodiments. One or more computer programs are stored on the non-transitory computer-readable storage medium, and when the computer programs are executed by one or more processors, the robot control method described in the embodiment above is implemented.

In the embodiments above, the description of each embodiment has its own emphasis. For parts that are not detailed or described in one embodiment, reference may be made to related descriptions of other embodiments.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/ terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes, which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals. It should be noted that, the content included in the computer readable medium could be appropriately increased and decreased according to requirements of legislation and patent practice under judicial jurisdictions. For example, in some judicial jurisdictions, the computer readable medium does not include the electric carrier signal and the telecommunication signal according to the legislation and the patent practice.

The foregoing description, for purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the present disclosure and its practical applications, to thereby enable others skilled in the art to best utilize the present disclosure and various embodiments with various modifications as are suited to the particular use contemplated.

What is claimed is:

1. A computer-implemented following method executed by one or more processors to control a robot that comprises a camera and a sensor electrically coupled to the one or more processors, the method comprising:
   performing a body detection to a body of a target based on images acquired by the camera to obtain a body detection result;
   performing a leg detection to legs of the target based on data acquired by the sensor to obtain a leg detection result;
   fusing the body detection result and the leg detection result to obtain a fusion result, and controlling the robot to follow the target based on the fusion result;
   determining whether disappearance of the target is detected;
   in response to detection of the disappearance of the target, determining a position of the target relative to the robot before disappearance of the target as a desired position, according to a last frame of data obtained by the camera and/or the sensor before the disappearance of the target;
   determining whether there is an obstacle between the desired position and the robot;
   in response to no obstacle being detected, determining a direction in which the target disappears according to the desired position, and controlling the robot to rotate according to the direction in which the target disappears, wherein a rotation direction of the robot is consistent with the direction in which the target disappears; and
   controlling the robot to stop moving, in response to no target being detected after the rotation of the robot.

2. The method of claim 1, wherein performing the body detection to the body of the target based on images acquired by the camera to obtain the body detection result comprises:
   identifying candidate objects in the images using a pre-trained neural network model, wherein the candidate objects have preset body skeleton features, the preset body skeleton features comprise features of a head, shoulders, arms, a body and legs, and the images are color images with depth information;
   determining the target from the candidate objects through facial recognition according to pre-stored facial features of the target;
   extracting identification features on the body of the target from the images, wherein the identification features on the body of the target comprise: color, texture and text on clothes of the target, decorations on the target, or appearance characteristics of the target; and
   determining, according to the identification features and external parameters of the camera relative to robot coordinates, position information of the body of the target in a robot coordinate system as the body detection result, wherein the external parameters comprise a relative pose of the camera.

3. The method of claim 1, wherein the sensor comprises a two-dimensional lidar sensor, and performing the leg detection to legs of the target based on data acquired by the sensor to obtain the leg detection result comprises:

acquiring two-dimensional lidar data from the two-dimensional lidar sensor, and dividing a two-dimensional point cloud in the two-dimensional lidar data to obtain a plurality of continuous line segments;

determining line segments of the plurality of continuous line segments, whose shape similarity with shape of the legs of the target is greater than a preset first similarity, to obtain a plurality of candidate legs;

identifying at least two legs of the plurality of candidate legs whose shape similarity is greater than a preset second similarity and a distance between the at least two legs is greater than a preset distance as belonging to a same object;

determining, according to position information of the at least two legs, position information of the legs of the target as the leg detection result, wherein position information of one of the at least two legs is determined as the leg detection result, or position information of center positions of the at least two legs is determined as the leg detection result.

4. The method of claim 1, further comprising, before fusing the body detection result and the leg detection result to obtain the fusion result, and controlling the robot to follow the target based on the fusion result, checking the body detection result and the leg detection result, wherein fusing the body detection result and the leg detection result to obtain the fusion result comprises: fusing the body detection result and the leg detection result after they have been checked.

5. The method of claim 4, wherein checking the body detection result comprises:
determining, according to the body detection result, whether a position of the target is within a preset first position range, and whether a linear velocity and an acceleration of the target are respectively less than a preset linear velocity threshold and a preset acceleration threshold, wherein the preset first position range is a best field of view and a best range of operation of the camera;
determining that the target has been detected, in response to the position of the target being within the preset first position range, and the linear velocity and the acceleration of the target being respectively less than the preset linear velocity threshold and the preset acceleration threshold; and
determining that the target is not detected, in response to the position of the target not being within the preset first position range, or the linear velocity and the acceleration of the target not being less than the preset linear velocity threshold and the preset acceleration threshold, respectively.

6. The method of claim 2, further comprising, before fusing the body detection result and the leg detection result to obtain the fusion result, and controlling the robot to follow the target based on the fusion result, checking the body detection result and the leg detection result;
wherein fusing the body detection result and the leg detection result to obtain the fusion result comprises: fusing the body detection result and the leg detection result after they have been checked; and
wherein the leg detection result comprises position information of a plurality of objects, and checking the leg detection result comprises:
filtering out one or more of the plurality of objects outside a preset second position range according to the leg detection result, wherein the preset second position range is a best range of operation of the sensor;
determining a distance between a remaining object of the plurality of objects and the camera, wherein the distance is determined by: calculating positions of shoulder centers in a body skeleton of the remaining object on a color image after the body skeleton of the remaining object in the color image taken by the camera is recognized using the pre-trained neural network model, obtaining depth information through a depth channel of the camera, and determining the distance between the remaining object and the camera according to the depth information; and
determining that the target has been detected in response to the distance between the remaining object and the camera being within a preset third position range, wherein the preset third position is an approximate radius of a circle surrounding a standing human.

7. The method of claim 1, wherein fusing the body detection result and the leg detection result to obtain the fusion result and controlling the robot to follow the target based on the fusion result comprises:
controlling, in response to only one of the body detection result and the leg detection result showing that the target is detected, the robot to follow the target according to the one of the body detection result and the leg detection result;
controlling, in response to both the body detection result and the leg detection result showing that the target is detected, and a distance between the target and the robot being within a preset range, the robot to follow the target according to the leg detection result; and
controlling, in response to both the body detection result and the leg detection result showing that the target is detected, and the distance between the target and the robot being outside the preset range, the robot to follow the target according to body detection result.

8. The method of claim 1, wherein controlling the robot to follow the target based on the fusion result comprises:
in response to determining that the target has been detected based on the fusion result, activating a direct tracking mode on the robot through a preset state machine, and in the direct tracking mode, calculating a linear velocity and an angular velocity of the robot, and controlling the robot to follow the target according to the linear velocity and angular velocity, wherein a moving path of the robot is not planned in the direct tracking mode;
wherein the method further comprises:
in response to detection of one or more obstacles, activating a trajectory tracking mode on the robot through the preset state machine, and in the trajectory tracking mode, determining a motion trajectory of the target according to each frame of data obtained in real time by the camera and/or the sensor before the disappearance of the target, wherein the position of the target relative to the robot in each frame of data obtained in real time by the camera and/or the sensor before the disappearance of the target is marked on a map to obtain the motion trajectory of the target, and a speed of the target is determined according to the position of the target relative to the robot in each frame of data obtained in real time by the camera and/or the sensor before the disappearance of the target;

planning the motion trajectory of the robot by using a preset path planner, and controlling the robot to move to each preset position on the motion trajectory at a specified time point by using a preset tracking controller, according to the motion trajectory of the target, wherein the preset path planner predicts a next moving direction and a next moving position of the target, based on the motion trajectory of the target, and a speed of a last position of the target on the motion trajectory of the target, and wherein the preset path planner plans the motion trajectory of the robot within a preset range according to the predicting result, a current pose of the robot, and the one or more obstacles between the desired position and the robot; and in response to the target being detected after the robot reaches an end of the motion trajectory of the robot, controlling the robot to operate in the direct tracking mode again through the preset state machine, and in response to no the target being detected after the robot reaches the end of the motion trajectory of the robot, controlling the robot to stop moving;

wherein, before determining the direction in which the target disappears according to the desired position, the robot is controlled to operate in a recovery mode through the preset state machine in response to no obstacle being detected, and the robot is controlled to rotate in the recovery mode; and wherein the method further comprises:
in response to the target being detected after the rotation of the robot, controlling the robot to operate in the direct tracking mode through the preset state machine.

9. The method of claim 8, further comprising, during controlling the robot to move to each preset position on the motion trajectory at a specified time point by using the preset tracking controller, calculating positions to be reached by the robot using an algorithm based on a potential field or a vector field according to each frame of data acquired by the camera and/or the sensor; and controlling the robot to move according to the positions to be reached.

10. A robot control device comprising:
one or more processors electrically coupled to a camera and a sensor of a robot;
a memory; and
one or more programs, wherein the one or more programs are stored in the memory and configured to be executed by the one or more processors, the one or more programs comprise:
instructions for performing a body detection to a body of a target based on images acquired by the camera to obtain a body detection result;
instructions for performing a leg detection to legs of the target based on data acquired by the sensor to obtain a leg detection result;
instructions for fusing the body detection result and the leg detection result to obtain a fusion result, and controlling the robot to follow the target based on the fusion result;
instructions for determining whether disappearance of the target is detected;
instructions for, in response to detection of the disappearance of the target, determining a position of the target relative to the robot before disappearance of the target as a desired position, according to a last frame of data obtained by the camera and/or the sensor before the disappearance of the target;
instructions for determining whether there is an obstacle between the desired position and the robot;
instructions for, in response to no obstacle being detected, determining a direction in which the target disappears according to the desired position, and controlling the robot to rotate according to the direction in which the target disappears, wherein a rotation direction of the robot is consistent with the direction in which the target disappears; and
instructions for controlling the robot to stop moving, in response to no target being detected after the rotation of the robot.

11. The robot control device of claim 10, wherein the instructions for performing the body detection to the body of the target based on images acquired by the camera to obtain the body detection result comprise:
instructions for identifying candidate objects in the images using a pre-trained neural network model, wherein the candidate objects have preset body skeleton features;
instructions for determining the target from the candidate objects through facial recognition according to pre-stored facial features of the target;
instructions for extracting identification features on the body of the target from the images; and
instructions for determining, according to the identification features, position information of the body of the target in a robot coordinate system as the body detection result.

12. The robot control device of claim 10, wherein the sensor comprises a two-dimensional lidar sensor, and the instructions for performing the leg detection to legs of the target based on data acquired by the sensor to obtain the leg detection result comprise:
instructions for acquiring two-dimensional lidar data from the two-dimensional lidar sensor, and dividing a two-dimensional point cloud in the two-dimensional lidar data to obtain a plurality of continuous line segments;
instructions for determining line segments of the plurality of continuous line segments, whose shape similarity with shape of the legs of the target is greater than a preset first similarity, to obtain a plurality of candidate legs;
instructions for identifying at least two legs of the plurality of candidate legs whose shape similarity is greater than a preset second similarity and a distance between the at least two legs is greater than a preset distance as belonging to a same object;
instructions for determining, according to position information of the at least two legs, position information of the legs of the target as the leg detection result.

13. The robot control device of claim 10, wherein the one or more programs comprise instructions for checking the body detection result and the leg detection result before fusing the body detection result and the leg detection result to obtain the fusion result and controlling the robot to follow the target based on the fusion result, wherein the instructions for fusing the body detection result and the leg detection result to obtain the fusion result comprise: instructions for fusing the body detection result and the leg detection result after they have been checked.

14. The robot control device of claim 13, wherein the instructions for checking the body detection result and the leg detection result comprise:

instructions for determining, according to the body detection result, whether a position of the target is within a preset first position range, and whether a linear velocity and an acceleration of the target are respectively less than a preset linear velocity threshold and a preset acceleration threshold; and instructions for determining that the target has been detected in response to the position of the target being within the preset first position range, and the linear velocity and the acceleration of the target being respectively less than the preset linear velocity threshold and the preset acceleration threshold.

15. The robot control device of claim 13, wherein the leg detection result comprises position information of a plurality of objects, and the instructions for checking the leg detection result comprise:

instructions for filtering out one or more of the plurality of objects outside a preset second position range according to the leg detection result;

instructions for determining a distance between a remaining object of the plurality of objects and the camera; and instructions for determining that the target has been detected in response to the distance between the remaining object and the camera being within a preset third position range.

16. The robot control device of claim 10, wherein the instructions for fusing the body detection result and the leg detection result to obtain the fusion result and controlling the robot to follow the target based on the fusion result comprise:

instructions for controlling, in response to only one of the body detection result and the leg detection result showing that the target is detected, the robot to follow the target according to the one of the body detection result and the leg detection result;

instructions for controlling, in response to both the body detection result and the leg detection result showing that the target is detected, and a distance between the target and the robot is within a preset range, the robot to follow the target according to the leg detection result; and instructions for controlling, in response to both the body detection result and the leg detection result showing that the target is detected, and the distance between the target and the robot is outside the preset range, the robot to follow the target according to body detection result.

17. The robot control device of claim 10, wherein instructions for controlling the robot to follow the target based on the fusion result comprise:

instructions for calculating a linear velocity and an angular velocity of the robot, and controlling the robot to follow the target according to the linear velocity and angular velocity; and wherein the one or more programs further comprise:

instructions for, in response to detection of one or more obstacles, determining a motion trajectory of the target according to each frame of data obtained in real time by the camera and/or the sensor before the disappearance of the target; and instructions for planning the motion trajectory of the robot by using a preset path planner, and controlling the robot to move to each preset position on the motion trajectory at a specified time point by using a preset tracking controller, according to the motion trajectory of the target.

18. The robot control device of claim 17, wherein the one or more programs further comprise, during controlling the robot to move to each preset position on the motion trajectory at a specified time point by using the preset tracking controller, instructions for calculating positions to be reached by the robot using an algorithm based on a potential field or a vector field according to each frame of data acquired by the camera and/or the sensor; and instructions for controlling the robot to move according to the positions to be reached.

19. A non-transitory computer-readable storage medium storing one or more programs to be executed in a robot that comprises a camera and a sensor electrically coupled to the one or more processors, the one or more programs, when being executed by one or more processors of the robot, causing the robot to perform processing comprising:

performing a body detection to a body of a target based on images acquired by the camera to obtain a body detection result;

performing a leg detection to legs of the target based on data acquired by the sensor to obtain a leg detection result;

fusing the body detection result and the leg detection result to obtain a fusion result, and controlling the robot to follow the target based on the fusion result;

determining whether disappearance of the target is detected;

in response to detection of the disappearance of the target, determining a position of the target relative to the robot before disappearance of the target as a desired position, according to a last frame of data obtained by the camera and/or the sensor before the disappearance of the target;

determining whether there is an obstacle between the desired position and the robot;

in response to no obstacle being detected, determining a direction in which the target disappears according to the desired position, and controlling the robot to rotate according to the direction in which the target disappears, wherein a rotation direction of the robot is consistent with the direction in which the target disappears; and controlling the robot to stop moving, in response to no target being detected after the rotation of the robot.

20. The computer-readable storage medium of claim 19, wherein performing the body detection to the body of the target based on images acquired by the camera to obtain the body detection result comprises:

identifying candidate objects in the images using a pre-trained neural network model, wherein the candidate objects have preset body skeleton features;

determining the target from the candidate objects through facial recognition according to pre-stored facial features of the target;

extracting identification features on the body of the target from the images; and determining, according to the identification features, position information of the body of the target in a robot coordinate system as the body detection result.

* * * * *